US011677971B2

(12) United States Patent
Krishnan et al.

(10) Patent No.: US 11,677,971 B2
(45) Date of Patent: Jun. 13, 2023

(54) METHOD AND APPARATUS FOR VIDEO CODING

(71) Applicant: Tencent America LLC, Palo Alto, CA (US)

(72) Inventors: Madhu Peringassery Krishnan, Mountain View, CA (US); Xin Zhao, Santa Clara, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/339,516

(22) Filed: Jun. 4, 2021

(65) Prior Publication Data

US 2022/0109864 A1    Apr. 7, 2022

Related U.S. Application Data

(60) Provisional application No. 63/086,280, filed on Oct. 1, 2020.

(51) Int. Cl.
*H04N 19/176* (2014.01)
*H04N 19/44* (2014.01)
(Continued)

(52) U.S. Cl.
CPC ........... *H04N 19/44* (2014.11); *H04N 19/105* (2014.11); *H04N 19/176* (2014.11); *H04N 19/46* (2014.11)

(58) Field of Classification Search
CPC .... H04N 19/44; H04N 19/105; H04N 19/176; H04N 19/46
See application file for complete search history.

(56) References Cited

U.S. PATENT DOCUMENTS

| 2015/0103918 A1* | 4/2015 | Wang | H04N 19/625 |
| | | | 375/240.24 |
| 2017/0310980 A1* | 10/2017 | Minoo | H04N 19/176 |

FOREIGN PATENT DOCUMENTS

| WO | 2018136128 A1 | 7/2018 | |
| WO | 2019/185980 A1 | 10/2019 | |
| WO | WO-2019185980 A1 * | 10/2019 | ........... H04N 19/172 |

OTHER PUBLICATIONS

International Search Report and Written Opinion dated Nov. 15, 2021 in PCT/US21/44727, 13 pages.

(Continued)

*Primary Examiner* — Dave Czekaj
*Assistant Examiner* — Berteau Joisil
(74) *Attorney, Agent, or Firm* — ArentFox Schiff LLP

(57) ABSTRACT

Aspects of the disclosure provide a method and an apparatus including processing circuitry for video decoding. The processing circuitry can decode coding information of a transform block (TB) from a coded video bitstream. The coding information can indicate a transform skip in one direction for the TB. The processing circuitry can decode a sign value of a current transform coefficient in the TB based on a previously decoded sign value of a previous transform coefficient. The current transform coefficient and the previous transform coefficient can be in one of a same row and a same column in the TB. The one of the same row and the same column can be along the one direction of the transform skip. The processing circuitry can determine the current transform coefficient in the TB based on the decoded sign value of the current transform coefficient.

20 Claims, 16 Drawing Sheets

(51) Int. Cl.
　　　*H04N 19/105*　　(2014.01)
　　　*H04N 19/46*　　(2014.01)

(56) References Cited

OTHER PUBLICATIONS

Peter de Rivaz et al., AV1 Bitstream & Decoding Process Specification, Jan. 18, 2019. (681 pages).
Benjamin Bross et al., General Video Coding Technology in Responses to the Joint Call for Proposals on Video Compression with Capability beyond HEVC; IEEE Transactions on Circuits and Systems for Video Technology, 2019. (16 pages).
Chun-Chi Chen et al., "Screen Content Coding Using Non-Square Intra Block Copy for HEVC", 2014 (6 pages).
Mei Guo et al., Inter-Layer Adaptive Filtering for Scalable Extension of HEVC, PCS, 2013, 165-168 (4 pages).
Mei Guo et al., Inter-Layer Intra Mode Prediction for Scalable Extension of HEVC, PCS, 2013, pp. 317-320 (4 pages).
PoLin Lai et al., Low Latency Directional Filtering for Inter-Layer Prediction in Scalable Video Coding using HEVC, PCS, 2013, pp. 269-272 (4 pages).
PoLin Lai et al., Combined Temporal and Inter-Layer Prediction for Scalable Video Coding using HEVC, PCS, 2013, pp. 117-120 (4 pages).
Shan Liu et al., Global/Local Motion-Compensated Frame Interpolation for Low Bitrate Video, 2000, 12 pages.
Shan Liu et al., Non-linear Motion-compensated Interpolation for Low Bit Rate Video, 2000, 11 pages.
Shan Liu et al., Nonlinear motion-compensated interpolation for low-bit-rate video, Proceedings of SPIE vol. 4115, Applications of Digital Image Processing XXII, Dec. 28, 2000, 12 pages.
Shan Liu et al., MCI-embedded Motion Compensated Prediction for Quality Enhancement of Frame Interpolation; 2000, 11 pages.
Shan Liu et al., MCI-embedded motion-compensated prediction for quality enhancement of frame interpolation, Proceedings of SPIE vol. 4209, Multimedia Systems and Applications III, Mar. 22, 2001, 12 pages.
Heung-Yeung Shum et al., Advances in Multimedia Information Processing—PCM 2001, Second IEEE Pacific Rim Conference on Multimedia, Beijing, China, Oct. 24-26, 2001; 10 pages.
Shan Liu et al., Improved Video Coding via Adaptive Selection of Generalized Motion Prediction Modes for B Frames; Picture Coding Symposium, 2001, pp. 358-361 (4 pages).
Shan Liu et al., Complexity Reduction of Joint Temporal-Spatial Bit Allocation Using R-D Models for Video Streaming; IEEE ICIP, 2002, pp. 729-732 (4 pages).
Shan Liu et al., MPEG Video Transcoding with Joint Temporal-Spatial Rate Control, Proceedings of SPIE vol. 4790, Applications of Digital Image Processing XXV, Nov. 21, 2002, 13 pages.
Shan Liu et al., Joint Temporal-Spatial Rate Control with Approximating Rate-Distortion Models, Proceedings of SPIE vol. 4671, 2002, pp. 746-755 (10 pages).
Shan Liu et al., Joint Temporal-Spatial Rate Control for Adaptive Video Transcoding, IEEE ICME 2003, II225-II228 (4 pages).
Shan Liu et al., Hybrid global-local motion compensated frame interpolation for low bit rate video coding, J. Vis. Commun. Image R. 14 (2003), pp. 61-79 (19 pages).
Shan Liu et al., Efficient MPEG-2 to MPEG-4 Video Transcoding, Image and Video Communications and Processing 2003, SPPIE vol. 5022 (2003), pp. 186-195 (10 pages).
Shan Liu et al., Joint Temporal-Spatial Bit Allocation for Video Coding with Dependency, IEEE Transactions on Circuits and Systems for Video Technology, vol. 15, No. 1, Jan. 2005, pp. 15-26 (12 pages).
Shan Liu et al.; Video Prediction Block Structure and the Emerging high Efficiency Video Coding Standard, 2012, 4 pages.
Shan Liu et al., Rectangular Partitioning for Intra Prediction in HEVC, 2012, 6 pages.

Jian Lou et al., Complexity and Memory Efficient GOP Structures Supporting VCR Functionalities in H.264/AVC, IEEE 2008, pp. 636-639 (4 pages).
Jian Lou et al., Trick-Play Optimization for H.264 Video Decoding, TR2010-076, Sep. 2010, 15 pages.
Wei Pu et al., Palette Mode Coding in HEVC Screen Content Coding Extension, IEEE Journal on Emerging and Selected Topics in Circuits and Systems, vol. 6, No. 4, Dec. 2016, 420-432 (13 pages).
Shan Liu et al., Bit-depth Scalable Coding for High Dynamic Range Video, TR2007-078, Apr. 2008, 12 pages.
Yu-Chen Sun et al., Palette Mode—A New Coding Tool In Screen Content Cording Extensions of HEVC, IEEE ICIP 2015, pp. 2409-2413 (5 pages).
Yu-Chen Sun et al., Improved Palette Index Map Coding on HEVC SCC, IEEE ICIP 2016, pp. 4210-4214 (5 pages).
Xiaozhong Xu et al., PU Level Intra Block Copying with Flipping Mode, APSIPA 2014, 7 pages.
Xiaozhong Xu et al., Block Vector Prediction in Intra Block Copy for HEVC Screen Content Coding, 2015 Data Compression Conference, IEEE, 2015, pp. 273-282 (10 pages).
Xiaozhong Xu et al., Intra Block Copy in HEVC Screen Content Coding Extensions, IEEE Journal on Emerging and Selected Topics in Circuits and Systems, 2016, 11 pages.
Ximin Zhang et al., Intra Mode Coding in HEVC Standard, 2012, 6 pages.
Yao-Jen Chang et al., Intra prediction using multiple reference lines for the versatile video coding standard, 2019, 8 pages.
Zhaobin Zhang et al., Fast Adaptive Multiple Transform for Versatile Video Coding, 2019 Data Compression Conference (DCC), IEEE 2019, pp. 63-72 (10 pages).
Zhaobin Zhang et al., Fast DST-7/DCT-8 with Dual Implementation Support for Versatile Video Coding, IEEE Transactions on Circuits and Systems for Video Technology, 2020, 17 pages.
Xin Zhao et al., Novel Statistical Modeling, Analysis and Implementation of Rate-Distortion Estimation for H.264/AVC Coders, IEEE Transactions on Circuits and Systems for Video Technology, vol. 20, No. 5, May 2010, pp. 647-660 (14 pages).
Xin Zhao et al., NSST: Non-Separable Secondary Transforms for Next Generation Video Coding, IEEE, 2016, 5 pages.
Xin Zhao et al., Low-Complexity Intra Prediction Refinements for Video Coding, IEEE, PCS 2018, pp. 139-143 (5 pages).
Xin Zhao et al., Joint Separable and Non-Separable Transforms for Next-Generation Video Coding, IEEE Transactions on Image Processing, 2018, 13 pages.
Xin Zhao et al., Coupled Primary and Secondary Transform for Next Generation Video Coding, IEEE, 2018, 4 pages.
Liang Zhao et al., Wide Angular Intra Prediction for Versatile Video Coding, Data Compression Conference (DCC), IEEE, 2019, pp. 53-62 (10 pages).
Benjamin Bross et al., Versatile Video Coding (Draft 2), Document: JVET-K1001-v6, Joint Video Experts Team (JVET) of ITU-T SG 16 WP 3 and ISO/IEC JTC 1/SC 29/WG 11, 11th Meeting: Ljubljana, SI, Jul. 10-18, 2018, 140 pages.
Benjamin Bross et al., Versatile Video Coding (Draft 6), Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019, 456 pages.
L. Zhao et al., CE3-related: Unified MPM list based on CE3-3.3 and CE3-3.5.1 (JVET-N0394), Mar. 2019, 12 pages.
Liang Zhao et al., CE3-related: Unified MPM list based on CE3-3.3 and CE3-3.5.1, Document JVET-N0394-r2, Mar. 2019, 11 pages.
Appendix A, JVET-N0394-test1 (3 pages).
Appendix B, JVET-N0394-test2 (3 pages).
Appendix C, JVET-N0394-test3 (3 pages).
Appendix D, JVET-N0394-test4 (3 pages).
Appendix E, JVET-N0394-test5 (3 pages).
Appendix F, JVET-N0394-test6 (3 pages).
Appendix G, JVET-N0394-test7 (3 pages).
Fabien Racapé et al., CE3-related: Wide-angle intra prediction for non-square blocks, JVET-K0500, 10 pages.
Fabien Racapé et al., CE3-related: Wide-angle intra prediction for non-square blocks, JVET-K0500_r1, 7 pages.

(56) References Cited

OTHER PUBLICATIONS

Fabien Racapé et al., CE3-related: Wide-angle intra prediction for non-square blocks, JVET-K0500_r2, 7 pages.
Fabien Racapé et al., CE3-related: Wide-angle intra prediction for non-square blocks, JVET-K0500_r3, 12 pages.
Fabien Racapé et al., CE3-related: Wide-angle intra prediction for non-square blocks, JVET-K0500_r4, 13 pages.
Appendix H, JVET-K0500-BMS (2 pages).
Appendix I, JVET-K0500-VTM (2 pages).
Appendix J, JVET-K0500-VTM-NoBF (2 pages).
Appendix K, JVET-L0283_CE3-1.1.1-VTM (3 pages).
Appendix L, JVET-L0283_CE3-1.1.2-VTM (3 pages).
Appendix M, JVET-L0283_CE3-1.1.3_C1-VTM (3 pages).
Appendix N, JVET-L0283_CE3-1.1.3_C2-VTM (3 pages).
Appendix O, JVET-L0283_CE3-1.1.3_C3-VTM (3 pages).
Appendix P, JVET-L0283_CE3-1.1.3-VTM (3 pages).
Appendix Q, JVET-L0283_CE3-1.1.4-VTM (3 pages).
Benjamin Bross et al., CE3: Multiple reference line intra prediction (Test 1.1.1, 1.1.2, 1.1.3 and 1.1.4), Document:JVET-L0283-v2, 7 pages.
Benjamin Bross et al., Versatile Video Coding (Draft 2), Document: JVET-K1001-v6, 141 pages.
Xin Zhao et al., CE6: On 8-bit primary transform core (Test 6.1.3), Document: JVET-L0285, 17 pages.
Appendix R, JVET-L0285_CE6-1.3a (2 pages).
Appendix S, JVET-L0285_CE6-1.3b (2 pages).
Appendix T, JVET-L0285_CE6-1.3b_LowQP (2 pages).
Appendix U, JVET-L0285_CE6-1.3a_LowQP (2 pages).
Xin Zhao et al., CE6: On 8-bit primary transform core (Test 6.1.3), Document: JVET-L0285-r1, 17 pages.
Xin Zhao et al., CE6: Fast DST-7/DCT-8 with dual implementation support (Test 6.2.3), Document: JVET-M0497, 11 pages.
Appendix V, JVET-M0497-CE6-2-3a (2 pages).
Appendix W, JVET-M0497-CE6-2-3a_LowQP (2 pages).
Xin Zhao et al., CE6-related: Unified LFNST using block size independent kernel, Document: JVET-O0539-v2, 13 pages.
Appendix X, JVET-O0539-vs-CE6-2.1a (2 pages).
Appendix Y, JVET-O0539-vs-CE6-2.1a-LowQP (2 pages).
Appendix Z, JVET-O0539-vs-CE6-2.1b (2 pages).
Appendix AA, JVET-O0539-vs-CE6-2.1b-LowQP (2 pages).
Appendix AB, JVET-O0539-vs-VTM5_r1 (2 pages).
Appendix AC, JVET-O0539-vs-VTM5-LowQP_r1 (2 pages).
Appendix AD, JVET-O0545_Log2MaxTbSize=4 (3 pages).
Appendix AE, JVET-O0545_Log2MaxTbSize=5 (2 pages).
Appendix AF, JVET-O0545_Log2MaxTbSize=6 (2 pages).
Xin Zhao et al., Non-CE6: Configurable max transform size in VVC, Document: JVET-O0545-v2, 6 pages.
Supplementary European Search Report dated Dec. 1, 2022 in Application No. 21876178.1, 8 pages.
Kao Jiun-Yu et al: "Improved transform skip mode for HEVC screen content coding", 2015 International Conference on Image Processing Theory, Tools and Applications (IPTA), IEEE, Nov. 10, 2015, pp. 504-509.

* cited by examiner

| Transform Type | Basis function $T_i(j)$, $i,j=0, 1,..., N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

FIG. 9

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓; DCT → | ✓ (block size ≤ 16×16) | ✓ (block size ≤ 16×16) |
| DCT_ADST | DCT ↓; ADST → | | |
| ADST_ADST | ADST ↓ and → | | |
| FLIPADST_DCT | FLIPADST ↓; DCT → | ✗ | ✓ (block size ≤ 16×16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16×16) | ✓ (block size ≤ 32×32) |
| V_DCT | DCT ↓; IDTX → | ✓ (block size < 16×16) | ✓ (block size ≤ 16×16) |
| H_DCT | IDTX ↓; DCT → | | |
| V_ADST | ADST ↓; IDTX → | ✗ | ✓ (block size < 16×16) |
| H_ADST | IDTX ↓; ADST → | | |
| V_FLIPADST | FLIPADST ↓; IDTX → | ✗ | ✓ (block size < 16×16) |
| H_FLIPADST | IDTX ↓; FLIPADST → | | |

*FIG. 10A*

| Intra prediction | Vertical Transform | Horizontal Transform |
|:---:|:---:|:---:|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

FIG. 10B

$$L_c = \begin{bmatrix} w_c + v_{c1} & -w_c & & & & 0 \\ -w_c & 2w_c & -w_c & & & \\ & -w_c & \ddots & & & \\ & & & & 2w_c & -w_c \\ 0 & & & & -w_c & w_c + v_{c2} \end{bmatrix} \text{ for } w_c > 0$$

METHOD AND APPARATUS FOR VIDEO CODING

INCORPORATION BY REFERENCE

This present disclosure claims the benefit of priority to U.S. Provisional Application No. 63/086,280, "CONTEXT DESIGN FOR ENTROPY CODING SIGN MAP FOR ONE-DIMENSIONAL TRANSFORM SKIP" filed on Oct. 1, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and/or decoding. In some examples, an apparatus for video decoding includes processing circuitry. The processing circuitry can decode coding information of a transform block (TB) from a coded video bitstream. The coding information can indicate a transform skip in one direction for the TB. The processing circuitry can decode a sign value of a current transform coefficient in the TB based on a previously decoded sign value of a previous transform coefficient. The current transform coefficient and the previous transform coefficient can be in one of a same row and a same column in the TB. The one of the same row and the same column can be along the one direction of the transform skip. The processing circuitry can determine the current transform coefficient in the TB based on the decoded sign value of the current transform coefficient.

In an embodiment, the one direction is a horizontal direction. The one of the same row and the same column is the same row that is along the one direction of the transform skip. The processing circuitry can decode the sign value of the current transform coefficient in the TB based on the previously decoded sign value of the previous transform coefficient in the same row that is along the one direction of the transform skip. In an example, the same row is limited to one of a subset of rows in the TB.

In an embodiment, the one direction is a vertical direction. The one of the same row and the same column is the same column that is along the one direction of the transform skip. The processing circuitry can decode the sign value of the current transform coefficient in the TB based on the previously decoded sign value of the previous transform coefficient in the same column that is along the one direction of the transform skip. In an example, the same column is limited to one of a subset of columns in the TB.

In an embodiment, the processing circuitry can decode a flag. The flag can indicate whether sign values of transform coefficients in the same row are identical. The transform coefficients in the same row can include the current transform coefficient and the previous transform coefficient.

The processing circuitry can decode a flag. The flag can indicate whether sign values of transform coefficients in the same column are identical. The transform coefficients in the same column can include the current transform coefficient and the previous transform coefficient.

The processing circuitry can decode the sign value of the current transform coefficient in the TB based on the previously decoded sign value of the previous transform coefficient, a previously decoded sign value of a DC transform coefficient in an above neighboring block of the TB, and a previously decoded sign value of a DC transform coefficient in a left neighboring block of the TB. The DC transform coefficient in the above neighboring block of the TB and the DC transform coefficient in the left neighboring block of the TB can have a DC spatial frequency.

In an example, the processing circuitry decodes the sign value of the current transform coefficient in the TB based on the previously decoded sign value of the previous transform coefficient and a weighted average of (i) the previously decoded sign value of the DC transform coefficient in the above neighboring block of the TB and (ii) the previously decoded sign value of the DC transform coefficient in the left neighboring block of the TB. The weighting can be based on numbers of transform coefficients in the above neighboring block and the left neighboring block that border with transform coefficients in the TB, respectively. A location of the previous transform coefficient in the TB can be a neighbor of a location of the current transform coefficient in the TB.

In an example, the location of the previous transform coefficient in the TB is the neighbor of the location of the current transform coefficient in the TB along a scanning direction. The scanning direction can be based on a scan order for coding sign values of transform coefficients in the TB.

In an embodiment, the processing circuitry can decode the sign value of the current transform coefficient in the TB based on the previously decoded sign value of the previous transform coefficient and one or more previously decoded sign values of respective one or more transform coefficients in the one of the same row and the same column.

Aspects of the disclosure also provide a non-transitory computer-readable medium storing instructions which when executed by a computer for video encoding and/or decoding cause the computer to perform the method for video encoding and/or decoding.

BRIEF DESCRIPTION OF THE DRAWINGS

Further features, the nature, and various advantages of the disclosed subject matter will be more apparent from the following detailed description and the accompanying drawings in which:

FIG. 9 shows examples of primary transform basis functions according to embodiments of the disclosure.

FIG. 10A shows exemplary dependencies of the availability of various transform kernels based on a transform block size and a prediction mode according to embodiments of the disclosure.

FIG. 10B shows exemplary transform type selections based on an intra prediction mode for a chroma component according to embodiments of the disclosure.

DETAILED DESCRIPTION OF EMBODIMENTS

Figure 1A:
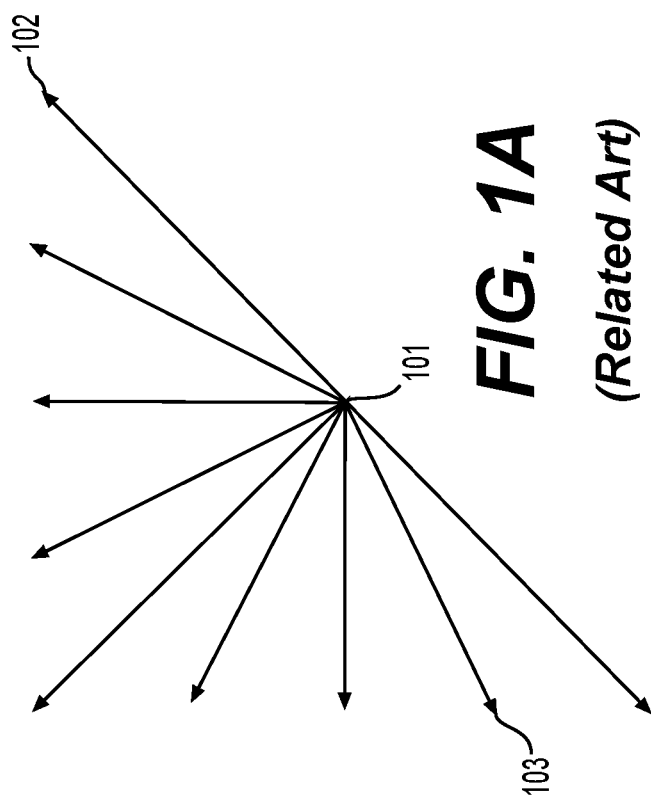
FIG. 1A is a schematic illustration of an exemplary subset of intra prediction modes.
Figure 1B:
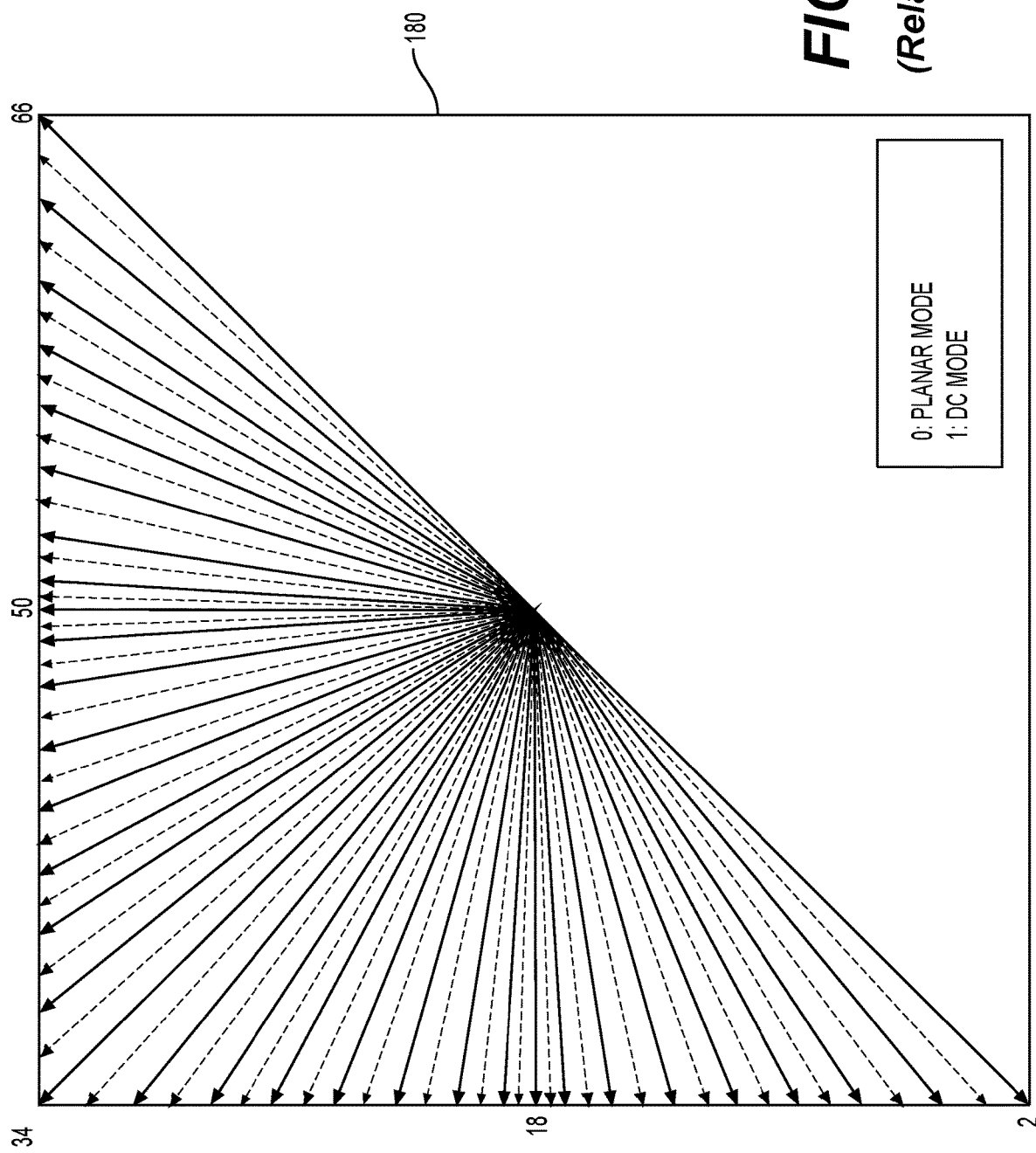
FIG. 1B is an illustration of exemplary intra prediction directions.
Figure 2:
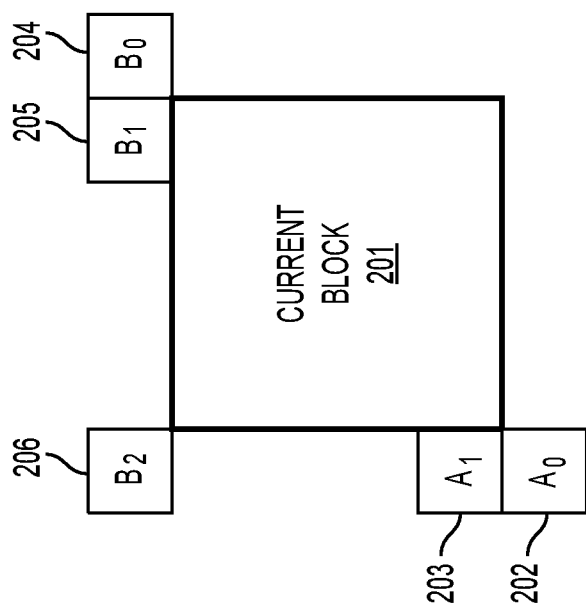
FIG. 2 is a schematic illustration of a current block and its surrounding spatial merge candidates in one example.
Figure 3:
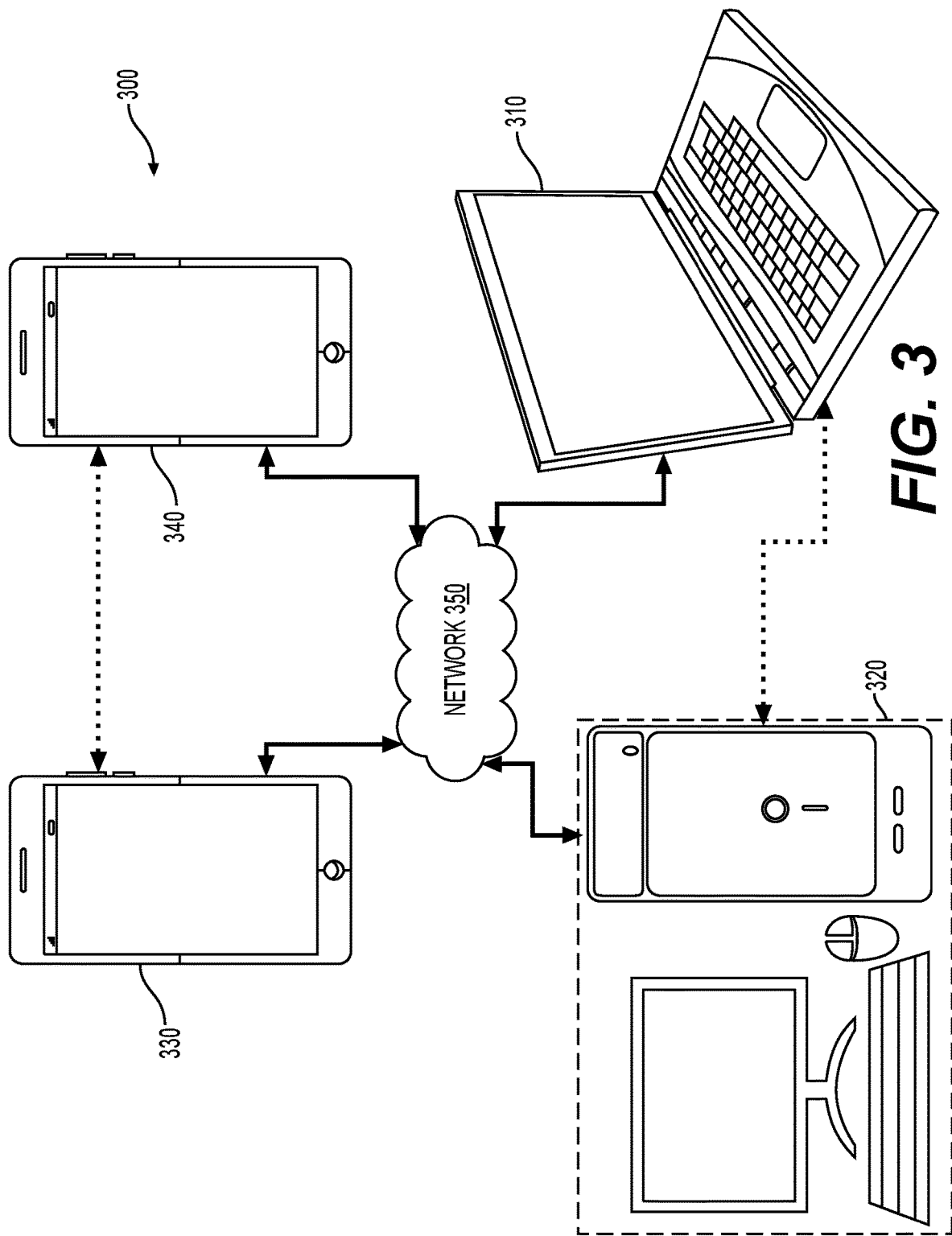
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
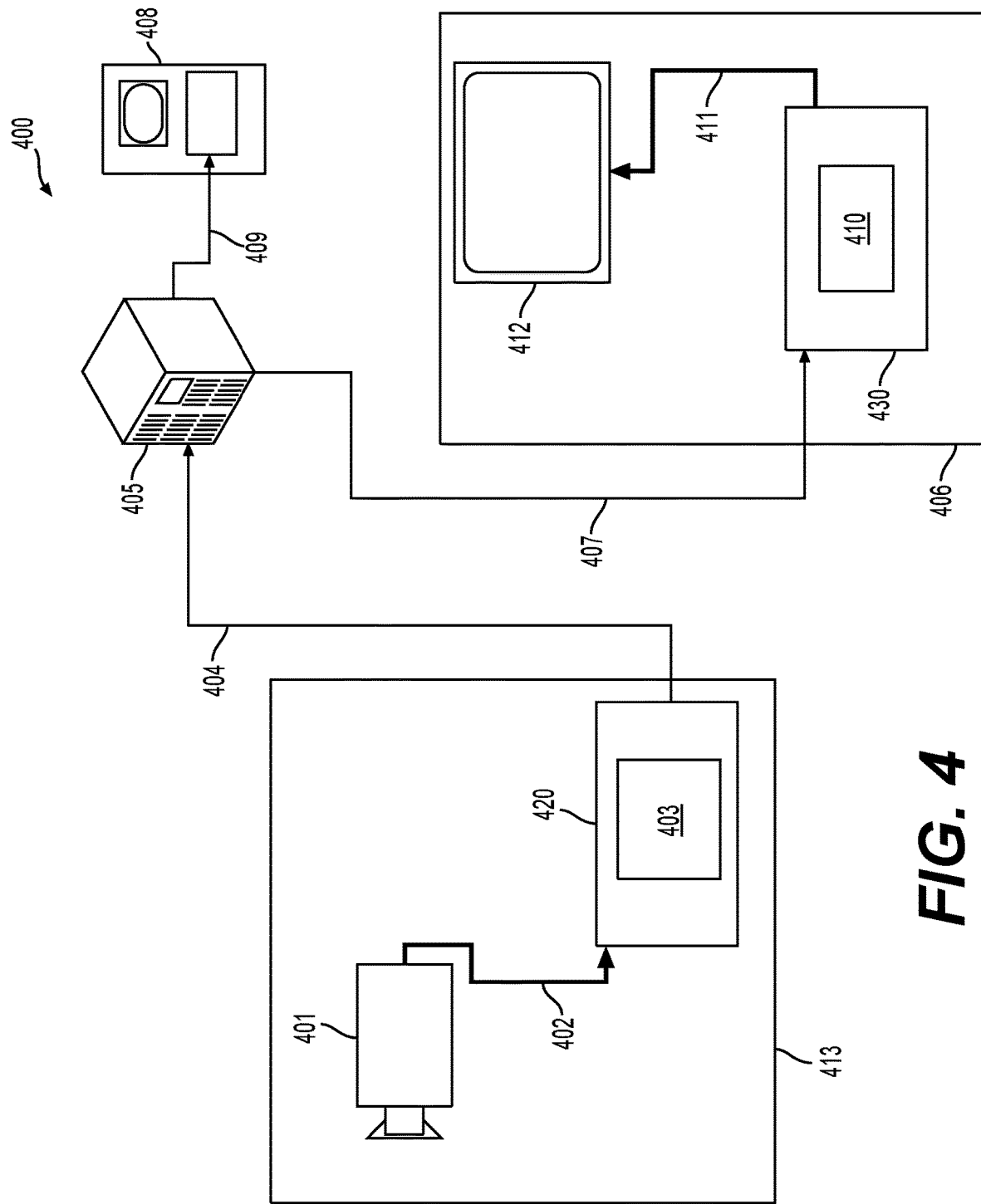
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
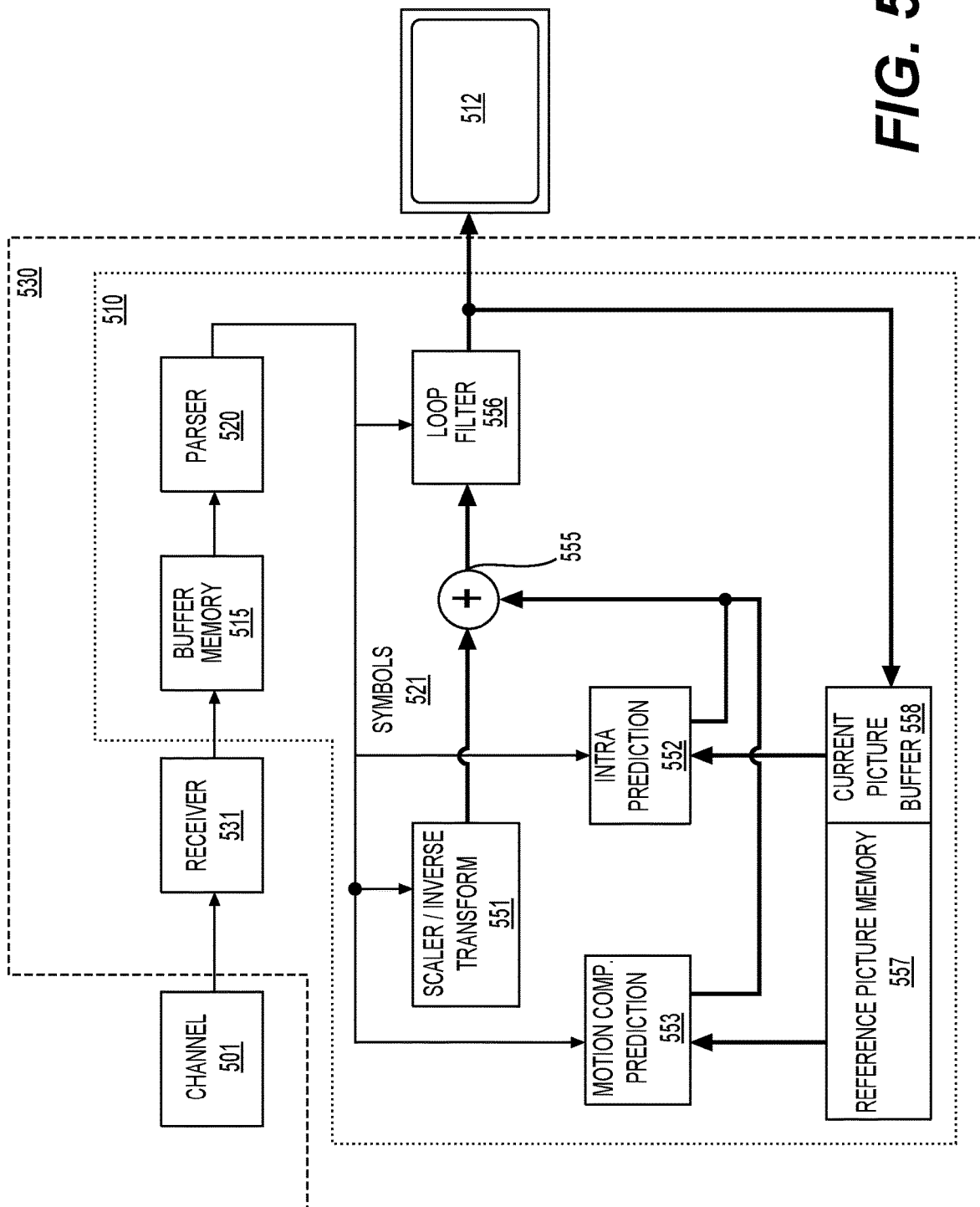
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
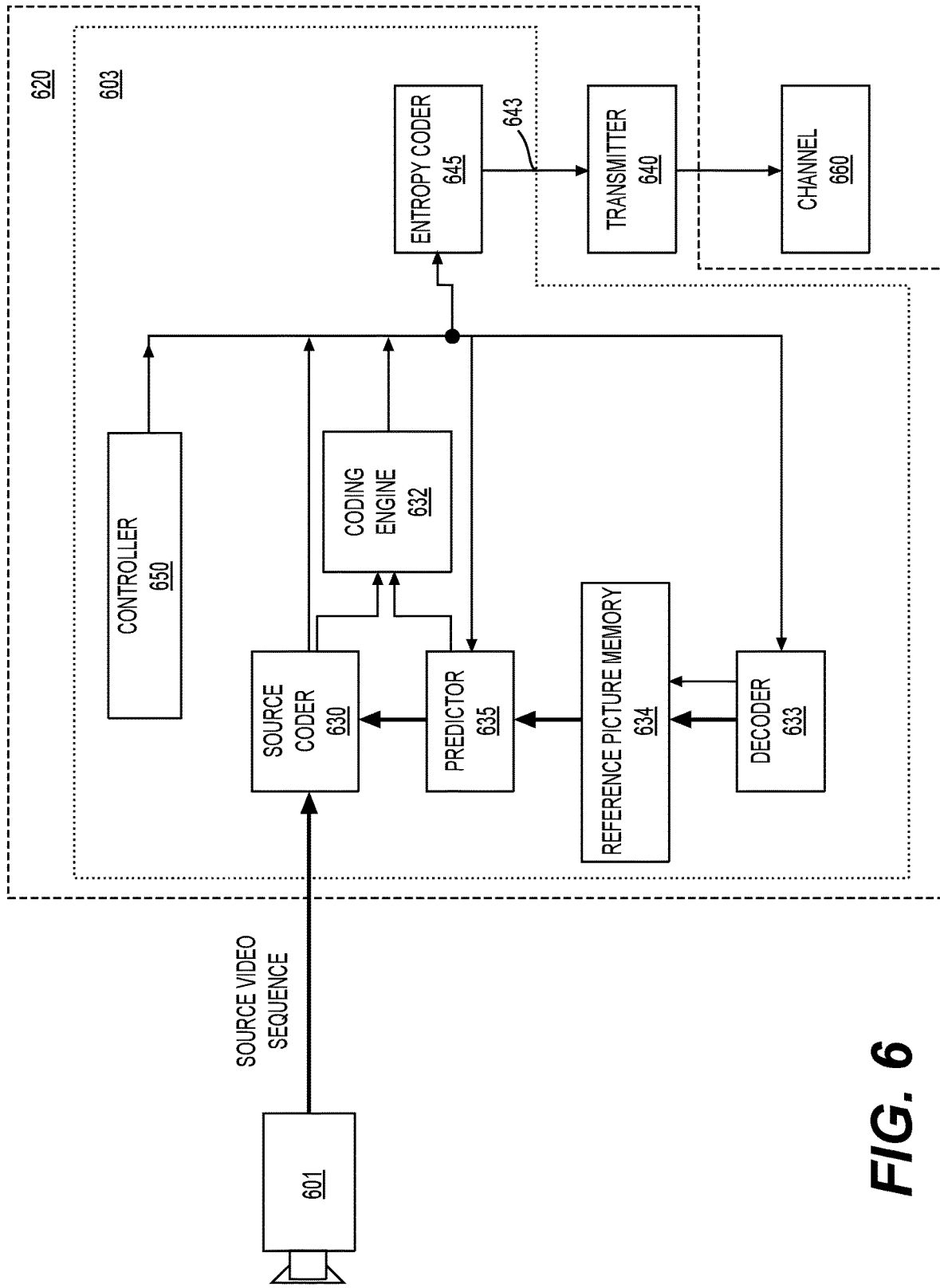
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
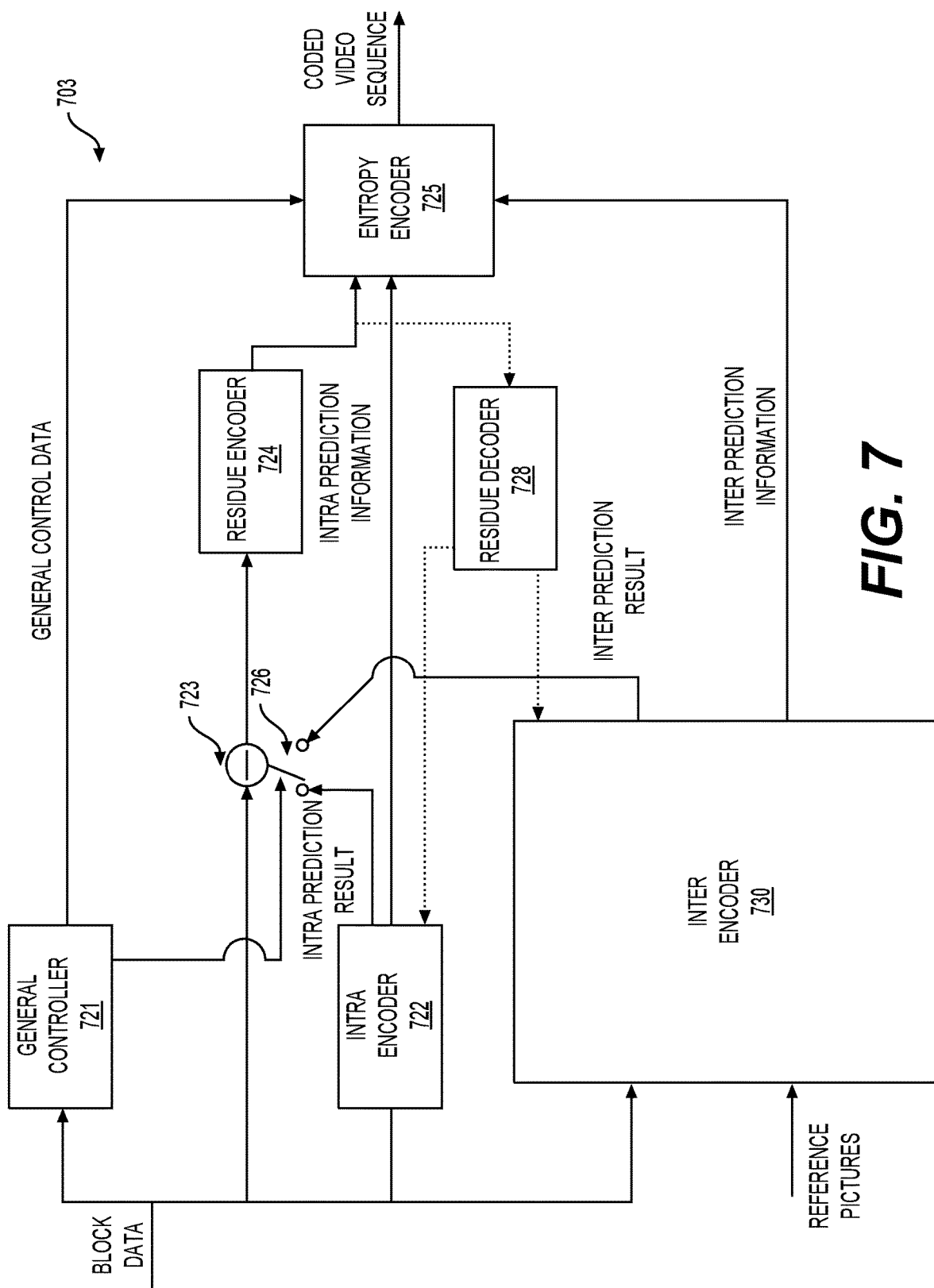
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
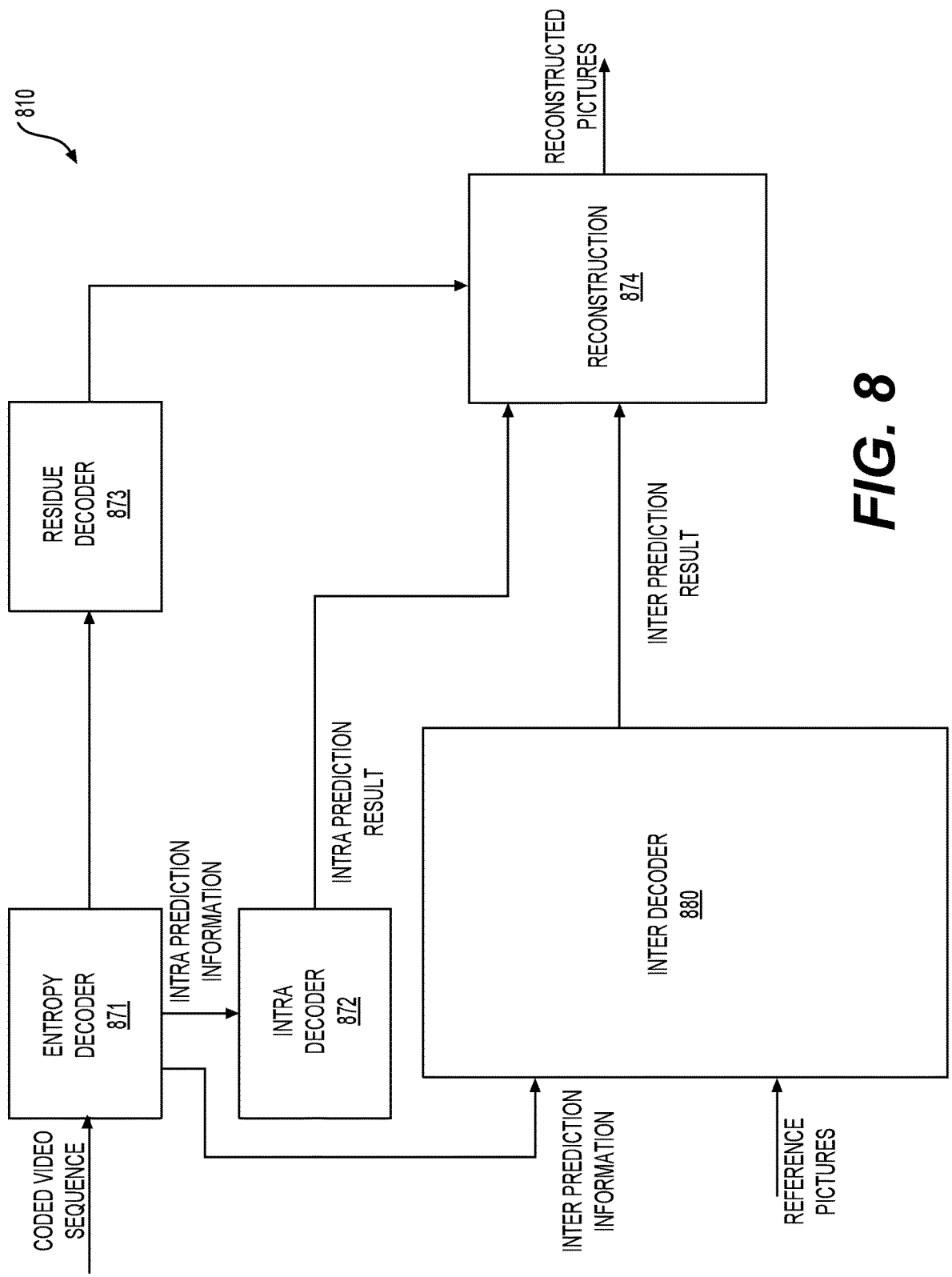
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure include a context design for entropy coding a sign map for one-dimensional (1D) transform skip. A set of video coding technologies designed for efficient compression of video data including a context design for entropy coding sign values of 1D transform skip coefficients can be provided.

Embodiments of primary transforms, such as those used in AOMedia Video 1 (AV1), are described below. In order to support extended coding block partitions, multiple transform sizes (e.g., ranging from 4-point to 64-point for each dimension) and transform shapes (e.g., square, a rectangular shape with a width over a height ratio of 2:1, 1:2, 4:1, or 1:4) can be used, such as in AV1.

A 2D transform process can use hybrid transform kernels that can include a different 1D transform for each dimension of a coded residual block. Primary 1D transforms can include (a) a 4-point, an 8-point, a 16-point, a 32-point, a 64-point DCT-2; (b) a 4-point, an 8-point, a 16-point asymmetric DST (ADST) (e.g., a DST-4, a DST-7) and corresponding flipped versions (e.g., a flipped version or a FlipADST of an ADST can apply the ADST in a reverse order); and/or (c) a 4-point, an 8-point, a 16-point, a 32-point identity transform (IDTX). FIG. 9 shows examples of primary transform basis functions according to embodiments of the disclosure. The primary transform basis functions in the FIG. 9 example include basis functions for the DCT-2 and the asymmetric DSTs (DST-4 and DST-7) having an N-point input. The primary transform basis functions shown in FIG. 9 can be used in AV1.

The availability of hybrid transform kernels can be dependent on a transform block size and a prediction mode. FIG. 10A shows exemplary dependencies of the availability of various transform kernels (e.g., transform types shown in the first column and described in the second column) based on the transform block size (e.g., sizes shown in the third column) and the prediction mode (e.g., the intra prediction and the inter prediction shown in the third column). The exemplary hybrid transform kernels and the availability based on the prediction modes and transform block sizes can be used in AV1. Referring to FIG. 10A, symbols "→" and "↓" denote a horizontal dimension (also referred to as a horizontal direction) and a vertical dimension (also referred to as a vertical direction), respectively. Symbols "✓" and "x" denote the availability of a transform kernel for the corresponding block size and the prediction mode. For example, the symbol "✓" denotes that the transform kernel is available, and the symbol "x" denotes that the transform kernel is unavailable.

In an example, a transform type (1010) is denoted by ADST DCT as shown in the first column of FIG. 10A. The transform type (1010) includes an ADST in the vertical direction and a DCT in the horizontal direction as shown in the second column of FIG. 10A. According to the third column of FIG. 10A, the transform type (1010) is available for the intra prediction and the inter prediction when the block size is less than or equal to 16×16 (e.g., 16×16 samples, 16×16 luma samples).

In an example, a transform type (1020) is denoted by V_ADST as shown in the first column of FIG. 10A. The transform type (1020) includes an ADST in the vertical direction and an IDTX (i.e., an identity matrix) in the horizontal direction as shown in the second column of FIG. 10A. Thus, the transform type (1020) (e.g., V_ADST) is performed in the vertical direction and is not performed in the horizontal direction. According to the third column of FIG. 10A, the transform type (1020) is not available for the intra prediction regardless of the block size. The transform type (1020) is available for the inter prediction when the block size is less than 16×16 (e.g., 16×16 samples, 16×16 luma samples).

In an example, FIG. 10A is applicable for a luma component. For a chroma component, a transform type (or a transform kernel) selection can be performed implicitly. In an example, for intra prediction residuals, the transform type can be selected according to an intra prediction mode, as shown in FIG. 10B. For inter prediction residuals, the transform type can be selected according to the transform type selection of a co-located luma block. Therefore, in an example, a transform type for the chroma component is not signaled in a bitstream.

Line graph transforms (LGT) can be used in transforms such as a primary transform, for example, in AOMedia Video 2 (AV2). 8-bit/10-bit transform cores can be used in AV2. In an example, LGTs include various DCTs, discrete sine transforms (DSTs), as described below. LGTs can include 32-point and 64-point 1-dimensional (1D) DSTs.

Graphs are generic mathematical structures including sets of vertices and edges that can be used for modelling affinity relations between objects of interest. Weighted graphs where a set of weights are assigned to edges and optionally to vertices can provide sparse representations for robust modeling of signals/data. LGTs can improve coding efficiency by providing a better adaptation for diverse block statistics. Separable LGTs can be designed and optimized by learning line graphs from data to model underlying row and column-wise statistics of residual signals of a block, and associated generalized graph Laplacian (GGL) matrices can be used to derive the LGTs.

Figures 11, 12:
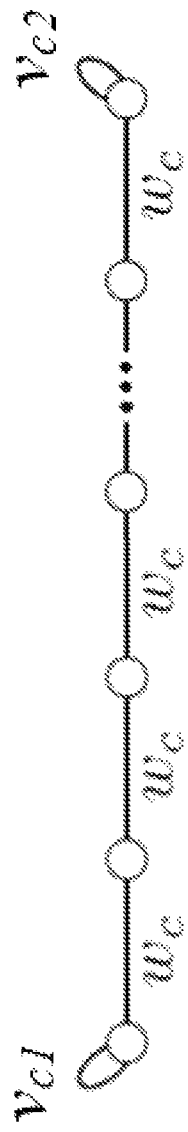
FIG. 11 shows an example of a generic line graph transform (LGT) characterized by self-loop weights and edge weights according to an embodiment of the disclosure.
FIG. 12 shows an exemplary generalized graph Laplacian (GGL) matrix according to an embodiment of the disclosure.

FIG. 11 shows an example of a generic LGT characterized by self-loop weights (e.g., $v_{c1}$, $v_{c2}$) and edge weights $w_c$ according to an embodiment of the disclosure. Given a weighted graph G (W, V), the GGL matrix can be defined as below.

$$L_c = D - W + V \qquad \text{(Eq. 1)}$$

where W can be an adjacency matrix including the non-negative edge weights $w_c$, D can be a diagonal degree matrix, and V can be a diagonal matrix denoting the self-loop weights $v_{c1}$ and $v_{c2}$. FIG. 12 shows an example of the matrix $L_c$.

The LGT can be derived by an Eigen-decomposition of the GGL matrix $L_c$ as below.

$$L_c = U \Phi U^T \qquad \text{(Eq. 2)}$$

where columns of an orthogonal matrix U can be the basis vectors of the LGT, and $\Phi$ can be a diagonal eigenvalue matrix.

In various examples, certain DCTs and DSTs (e.g., DCT-2, DCT-8, and DST-7), are subsets of a set of LGTs derived from certain forms of the GGLs. The DCT-2 can be derived by setting $v_{c1}$ to 0 (e.g., $v_{c1}=0$). The DST-7 can be derived by setting $v_{c1}$ to $w_c$ (e.g., $v_{c1}=w_c$). The DCT-8 can be derived by setting $b_{c2}$ to $w_c$ (e.g., $v_{c2}=w_c$). The DST-4 can be derived by setting $v_{c1}$ to $2 w_c$ (e.g., $v_{c1}=2 w_c$). The DCT-4 can be derived by setting $v_{c2}$ to $2 w_c$ (e.g., $v_{c2}=2 w_c$).

In some examples, such as in AV2, the LGTs can be implemented as matrix multiplications. A 4-point (4p) LGT core can be derived by setting $v_{c1}$ to $2 w_c$ in Lc, and thus the 4p LGT core is the DST-4. An 8-point (8p) LGT core can be derived by setting $v_{c1}$ to $1.5 w_c$ in Lc. In an example, an LGT core, such as a 16-point (16p) LGT core, a 32-point (32p) LGT core, or a 64-point (64p) LGT core, can be derived by setting $v_{c1}$ to be $w_c$ and $v_{c2}$ to be 0 and the LGT core can become DST-7.

According to aspects of the disclosure, a block can refer to a transform block (TB). In an example, a block or a TB includes transform coefficients. A row in a block can refer to a row of transform coefficients in the block (e.g., the TB). A column in a block can refer to a column of transform coefficients in the block (e.g., the TB).

The letter "H" or "V" when added to a transform type can indicate that the transform type is only applied in a horizontal or vertical direction, respectively. For example, V_DCT can refer to a 1D transform scheme that applies DCT only on the vertical direction, H_DCT can refer to a 1D transform scheme that applies DCT only on the horizontal direction, V_ADST can refer to a 1D transform scheme that applies ADST or any suitable non-DCT transform only on the vertical direction, H_ADST can refer to a 1D transform scheme that applies ADST or any suitable non-DCT transform only on the horizontal direction. V_FLIPADST can refer to a 1D transform scheme that applies a FLIPADST only on the vertical direction, H_FLIPADST can refer to a 1D transform scheme that applies a FLIPADST only on the horizontal direction. V_LGT can refer to a 1D transform scheme that applies LGT only on the vertical direction, H_LGT can refer to a 1D transform scheme that applies LGT only on the horizontal direction. V_FLIPLGT can refer to a 1D transform scheme that applies a FLIPLGT only on the vertical direction, H_FLIPLGT can refer to a 1D transform scheme that applies FLIPLGT only on the horizontal direction where a FLIPLGT is a flipped version of an LGT. Further, V_KLT can refer to a 1D transform scheme that applies a Karhunen-Loeve transform (KLT) only on the vertical direction, H_KLT can refer to a 1D transform scheme that applies a KLT only on the horizontal direction.

A set of transform types with a transform skip in the horizontal direction can be referred to as a set A of transforms. The set A of transforms can include transforms in the vertical direction. A transform in the set A of transforms can include a single or a suitable combination of predetermined transforms, such as V_DCT, V_ADST, V_FLIPADST, V_LGT, V_FLIPLGT, V_KLT, and/or the like. In an example, a transform in the set A of transforms includes a primary transform in the vertical direction. In an example, a transform in the set A of transforms includes a primary transform in the vertical direction and a secondary transform in the vertical direction. In an example, the set A of transform types exhaustively includes any or all combinations of the predetermined transforms, such as DCT, ADST, FLIPADST, LGT, FLIPLGT, and KLT in the vertical direction and a transform skip in the horizontal direction.

A set of transform types with a transform skip in the vertical direction can be referred to as a set B of transforms. The set B of transforms can include transforms in the horizontal direction. A transform in the set B of transforms can include a single or a suitable combination of predetermined transforms, such as H_DCT, H_ADST, H_FLIPADST, H_LGT, H_FLIPLGT, H_KLT, and/or the like. In an example, a transform in the set B of transforms includes a primary transform in the horizontal direction. In an example, a transform in the set B of transforms includes a primary transform in the horizontal direction and a secondary transform in the horizontal direction. In an example, the set B of transform types exhaustively includes any or all combinations of the predetermined transforms, such as DCT, ADST, FLIPADST, LGT, FLIPLGT, and KLT in the horizontal direction and a transform skip in the vertical direction.

In an embodiment, a level-map coefficient coding scheme can be used, such as in AV1. The level-map coefficient coding scheme is different from related coding schemes that process each 2D transform coefficient sequentially. An example of the level-map coefficient coding scheme is described below. For each transform unit (e.g., a TB (1301) in FIG. 13A), the level-map coefficient coding can first code a skip sign, which is followed by signaling a primary transform kernel type and an end-of-block (EOB) position if a transform coding is not skipped. Subsequently, coefficient values (i.e., values of transform coefficients in the transform unit) can be coded in a multiple level map manner combined with coding sign values.

In an example, the multiple level maps include three level maps that are coded as three level planes, such as a lower-level plane, a middle-level plane, and a higher-level plane, and the sign values are coded as a separate plane. The lower-level plane, the middle-level plane, and the higher-level plane can correspond to different ranges of coefficient magnitudes. In an example, the lower level plane corresponds to a range of 0 to 2, the middle level plane corresponds to a range of 3 to 14, and the higher-level plane corresponds to a range of 15 and above. The three level planes can be coded as follows: (a) the EOB position is coded; (b) the lower-level plane and the middle-level plane are coded together in a backward scan order, and the scan order can refer to a zig-zag scan applied on the entire transform unit basis; (c) the sign plane and the higher-level plane are coded together in a forward scan order; and (d) the remainder (coefficient level minus 14) is entropy coded using an exponential-Golomb (Exp-Golomb) code. A context model applied to the lower level plane can depend on a primary transform direction (e.g., bi-directional, horizontal, and vertical) as well as a transform size, and up to five neighbors coefficients in the frequency domain can be used to derive the context. The middle level plane can use a similar context model. In an example, a number of context neighbor coefficients is reduced from five to two. The higher-level plane can be coded by the Exp-Golomb code without using a context model.

Figure 13B:
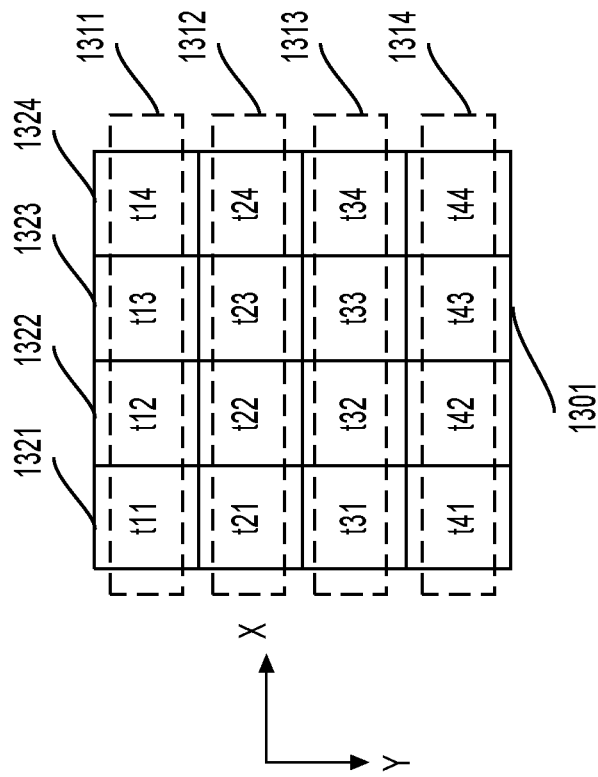
FIG. 13B shows an example of a TB according to an embodiment of the disclosure.
Figure 13A:
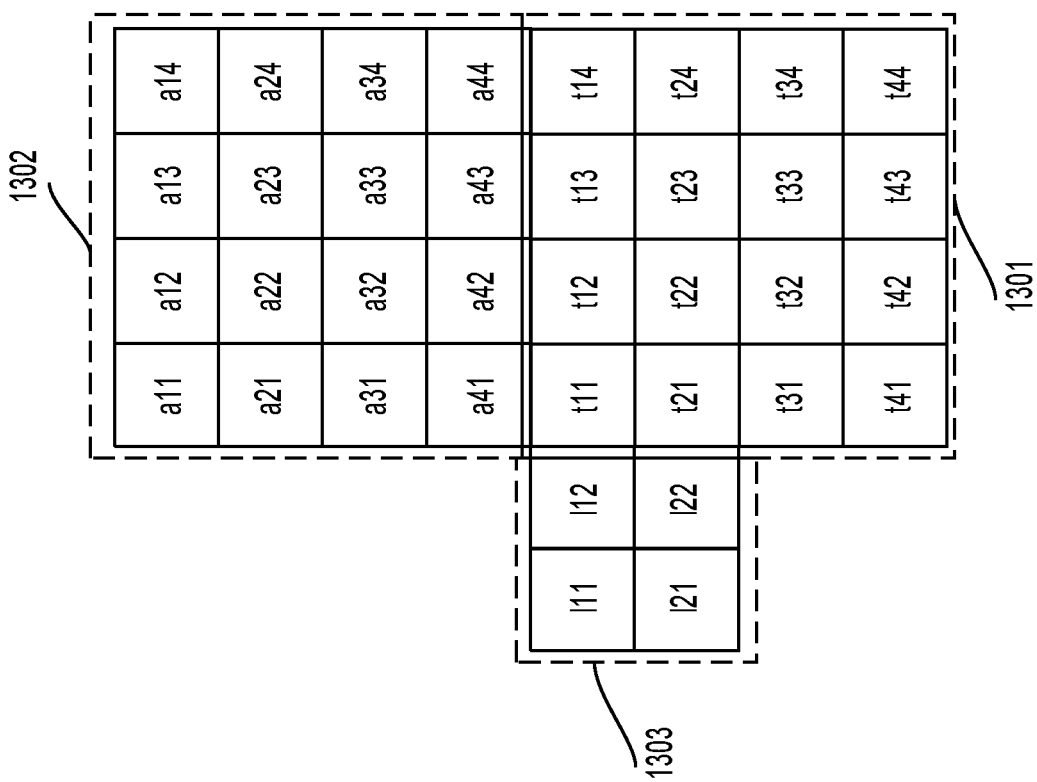
FIG. 13A shows an example of a transform block (TB) and neighboring blocks according to an embodiment of the disclosure.

FIG. 13A shows an example of a TB (1301) and neighboring blocks (e.g., TBs (1302) and (1303)) according to an embodiment of the disclosure. The TB (1301) can include transform coefficients (e.g., t11-t14, t21-t24, t31-t34, and t41-t44). In some examples, the transform coefficient t11 is a DC transform coefficient having a DC spatial frequency, and remaining transform coefficients in the TB (1301) are AC transform coefficients having AC spatial frequencies.

A DC sign (or a DC sign value), for example, a sign value of a DC coefficient in the transform unit (e.g., the DC transform coefficient t11 in the TB (1301)), can be coded using a context modelling approach. In an example, the DC sign value is "1" when the DC coefficient is negative, and the DC sign value is "0" when the DC coefficient is positive. A weighted average of DC signal values of neighboring blocks of the transform unit can be used to derive context information. In an example, a DC sign value (e.g., dc_sign(i) and i is 1) of an above neighboring block (e.g., the TB (1302)) and a DC sign value (e.g., dc_sign(i) and i is 2) of a left neighboring block (e.g., the TB (1303)) are used to derive the context information, as described in Eq. 3 below. The weighting can depend on a length (or an intersection length) (e.g., overlap(i,curr_block), i is 1 or 2) of an intersection of a neighboring transform block with the transform unit (e.g., the current TB). The intersection length between a first block and a second block can refer to a number of transform coefficients in the first block that borders with transform coefficients in the second block. For example, the intersection length (e.g., overlap(1,curr_block)) between the TBs (1301) and (1302) is 4 since four transform coefficients (t11-t14) in the TB (1301) border four transform coefficients (a11-a14) in the TB (1302). The intersection length (e.g., overlap(2,curr_block)) between the TBs (1301) and (1303) is 2 since two transform coefficients (t11 and t12) in the TB (1301) border two transform coefficients (112 and 122) in the TB (1303).

The derived context information can be used as an index (e.g., a dc ctx) to access three different contexts for coding the DC sign, as described in Eq. 4. For example, the context corresponding to the index 0 is used if the weighted average is 0, the context corresponding to the index 1 is used if the weighted average is less than 0, and the context corresponding to the index 2 is used if the weighted average is larger than 0. Sign values of other coefficients in the transform unit can be coded directly without using a context model.

$$dc\_sum = \sum_{i \in neighbors} dc\_sign(i) * overlap(i, curr\_block) \quad (Eq. 3)$$

$$dc\_ctx = 0 \text{ if } dc\_sum = 0, \quad (Eq. 4)$$
$$= 1 \text{ if } dc\_sum < 0,$$
$$= 2 \text{ if } dc\_sum > 0,$$

Sign values of other transform coefficients (e.g., the AC transform coefficients) in the TB (1301) can be coded directly without using the context model.

As described above with reference to FIG. 13A, in some examples, the DC sign coding only utilizes the DC signs of the above and left neighbors to derive the contexts to be used for coding the DC sign of the DC transform coefficient in the current transform block. In an example, the DC sign coding only utilizes the DC signs of the above and left neighbors to derive context information, and the context information can be used to derive the contexts for coding the DC sign of the DC transform coefficient in the current transform block. For TBs using a transform type that includes a transform skip in one direction, either transform coefficients in the top row (if the horizontal transform skip is used) or the coefficients in the left column (if the vertical transform skip is used) are DC coefficients. Thus, in some examples, applying context modeling for entropy coding a sign of only the first transform coefficient can be sub-optimal as sign values show either strong a row-wise correlation (for the horizontal transform skip) or a column-wise correlation (for vertical transform skip).

A 1D transform skip can refer to a transform skip in one dimension (e.g., the horizontal dimension or the vertical dimension), and thus a transform (e.g., a primary transform, a combination of a primary transform and a secondary transform) with the 1D transform skip is performed on one dimension of a block. A 1D transform can refer to a transform that is only applied to one dimension of the block where the transform includes the 1D transform skip. A 1D transform can refer to a 1D horizontal transform or a 1D vertical transform. The 1D horizontal transform can refer to a transform that is only applied to the horizontal dimension of the block where the transform includes the 1D transform skip in the vertical dimension. The 1D vertical transform can refer to a transform that is only applied to the vertical dimension of the block where the transform includes the 1D transform skip in the horizontal dimension.

A 2D transform skip can refer to a transform skip in two dimensions (e.g., the horizontal dimension and the vertical dimension), and thus there is no transform on the block and the transform matrix is an identity matrix. When there is no transform skip, a transform can be performed on two dimensions on the block.

According to aspects of the disclosure, context can be used for entropy coding one or more sign values of one or more transform coefficients in a block (e.g., a TB, a CB, a PB, a luma block, a chroma block, a luma TB, a chroma TB, or the like) using a 1D transform. The block can be any suitable block, such as a luma block, a chroma block, or the like. The context used can be any suitable context, such as sign information (e.g., sign value(s)) of other transform coefficient(s) in the block. In an example, context can be used for entropy coding one or more sign values of one or more transform coefficients in a block using a transform type in the set A of transforms. In an example, context can be used for entropy coding one or more sign values of one or more transform coefficients in a block using a transform type in the set B of transforms.

According to aspects of the disclosure, coding information of a block (e.g., a TB) can be decoded from a coded video bitstream. The coding information can indicate a transform skip in one direction for the block. A sign value of a current transform coefficient in the TB can be coded (e.g., encoded or decoded) based on a previously coded (e.g., encoded or decoded) sign value of a previous transform coefficient. The current transform coefficient and the previous transform coefficient can be in one of a same row and a same column in the TB. The one of the same row and the same column can be along the one direction of the transform skip. Further, the current transform coefficient in the TB can be determined based on the coded (e.g., encoded or decoded) sign value of the previous transform coefficient. In an example, the sign value of the current transform coefficient in the TB is decoded based on the previously decoded sign value of the previous transform coefficient and one or more previously decoded sign values of respective one or more transform coefficients in the one of the same row and the same column.

In an example, the one direction is a horizontal direction. The one of the same row and the same column is the same row that is along the one direction of the transform skip. Thus, the transform is the 1D vertical transform, such as a transform type in the set A of transforms. The sign value of the current transform coefficient in the TB can be coded (e.g., encoded or decoded) based on the previously coded (e.g., encoded or decoded) sign value of the previous transform coefficient in the same row that is along the one direction of the transform skip. In an example, the same row is limited to one of a subset of rows in the TB.

In an embodiment, a context derivation process for entropy coding a sign value of a current transform coefficient in the block using a transforms type in the set A of transforms is based on at least one previously coded sign value of at least one previous transform coefficient in a same row. In general, the context used can include sign information (e.g., at least one previously coded sign value) of other transform coefficient(s) (e.g., the at least one previous transform coefficient) in the same row.

FIG. 13B shows the TB (1301) that is transformed with the 1D transform skip in the vertical dimension or the horizontal dimension. Accordingly, in addition to the first transform coefficient (e.g., t11), remaining transform coefficients in a first column (1321) or a first row (1311) can be DC transform coefficients.

Referring to FIG. 13B, the TB (1301) is transformed with a transform type in the set A of transforms, for example, a 1D vertical transform with a 1D transform skip in the horizontal dimension. The first row (1311) includes the DC transform coefficients t11-t14. In an example, a sign value of one transform coefficient (e.g., t13) of the first row (1311) is entropy coded using a context derivation process based on one or more previously coded transform coefficients (e.g., t11 and/or t12) in the first row (1311). The above description can be suitably adapted to code other transform coefficient(s) in the row (1311).

Rows (1312)-(1314) include AC transform coefficients having AC spatial frequencies. The above description can be suitably adapted to one or more of the rows (1321)-(1324). In an example, a sign value of one transform coefficient (e.g., t24) of the second row (1312) is entropy coded using a context derivation process based on one or more previously coded transform coefficients (e.g., t21, t22, and/or t24) in the second row (1312). In an example, a default context is used to code a first transform coefficient (e.g., t21) in a row (e.g., the row (1312)). Alternatively, the usage of context for entropy coding sign values is enabled only for a subset (e.g., the row (1311), the rows (1311)-(1312), or the like) of rows in the block using the transform type in the set A of transforms. In an example, the usage of context for entropy coding sign values is enabled only for the rows (1311)-(1312), and sign values for the rows (1313)-(1314) can be directly coded without using a context model.

In an example, the one direction is a vertical direction. The one of the same row and the same column is the same column that is along the one direction of the transform skip. Thus, the transform is the 1D horizontal transform, such as a transform type in the set B of transforms. The sign value of the current transform coefficient in the TB can be coded (e.g., encoded or decoded) based on the previously coded (e.g., encoded or decoded) sign value of the previous transform coefficient in the same column that is along the one direction of the transform skip. In an example, the same column is limited to one of a subset of columns in the TB.

In an embodiment, a context derivation process for entropy coding sign values of a current transform coefficient in the block using a transform type in the set B of transforms is based on at least one previously coded sign value of at least one previous transform coefficient in a same column. In general, the context used can include sign information (e.g., at least one previously coded sign value) of other transform coefficient(s) (e.g., the at least one previous transform coefficient) in the same column.

Referring back to FIG. 13B, the TB (1301) is transformed with a transform type in the set B of transforms, for example, a 1D horizontal transform with a 1D vertical skip. The first column (1321) includes the DC transform coefficients t11, t21, t31, and t41. In an example, a sign value of one transform coefficient (e.g., t31) of the first column (1321) is entropy coded using a context derivation process based on one or more previously coded transform coefficients (e.g., t11 and/or t21) in the first column (1321). The above description can be suitably adapted to code other transform coefficient(s) in the column (1321).

Columns (1322)-(1324) include AC transform coefficients having AC spatial frequencies. The above description can be suitably adapted to one or more of the columns (1322)-(1324). In an example, a sign value of one transform coefficient (e.g., t42) of the second column (1322) is entropy coded using a context derivation process based on one or more previously coded transform coefficients (e.g., t12, t22, and/or t32) in the second column (1322). In an example, a default context is used to code a first transform coefficient (e.g., t12) in a column (e.g., the column (1322)). Alternatively, the usage of context for entropy coding sign values is enabled only for a subset (e.g., the column (1321), the columns (1321)-(1322), or the like) of columns in the block using the transform type in the set B of transforms. In an example, the usage of context for entropy coding sign values is enabled only for the columns (1321)-(1322), and sign values for the columns (1323)-(1324) can be directly coded without using a context model.

In an embodiment, the sign value of the current transform coefficient in the TB (e.g., the TB (1301) in FIG. 13B) can be decoded based on the previously decoded sign value of the previous transform coefficient (e.g., t12), a previously decoded sign value of a DC transform coefficient in an above neighboring block of the TB, and a previously decoded sign value of a DC transform coefficient in a left neighboring block of the TB. The DC transform coefficient in the above neighboring block of the TB and the DC transform coefficient in the left neighboring block of the TB have a DC spatial frequency.

In an example, the sign value of the current transform coefficient in the TB can be decoded based on the previously decoded sign value of the previous transform coefficient and a weighted average, for example, as shown in Eq. 3 of the previously decoded sign value of the DC transform coefficient in the above neighboring block of the TB and the previously decoded sign value of the DC transform coefficient in the left neighboring block of the TB. The weighting can be based on numbers of transform coefficients in the above neighboring block and the left neighboring block that border with transform coefficients in the TB, respectively. A location of the previous transform coefficient in the TB can be a neighbor of a location of the current transform coefficient in the TB. The location of the previous transform coefficient in the TB can be the neighbor of the location of the current transform coefficient in the TB along a scanning direction. The scanning direction can be based on a scan order for coding sign values of transform coefficients in the TB.

A context derivation process, such as the context derivation process described by Eqs. (3)-(4), can be improved for entropy coding sign value(s) of transform coefficient(s) in a block using a transform type in one of the set A and the set B transforms. In an embodiment, the context derivation process for entropy coding the sign value(s) of the transform coefficient(s) in the block is based not only on one or more neighboring block (e.g., a weighted average of DC sign values of an above neighboring block and a left neighboring block), but also on at least one previously coded sign value of at least one neighboring coefficient (if available) in the block. In general, the context used for entropy coding a sign value of a transform coefficient in the block can include sign information of other block(s) (e.g., the above neighboring block, the left neighboring block, and/or the like), sign information of other transform coefficient(s) in the block, and/or the like. In an example, the at least one neighboring coefficient depends on a scan order used for coding sign values of the block. The at least one neighboring coefficient can be transform coefficient(s) in the block that are coded prior to the transform coefficient according to the scan order.

Referring to FIG. 13B, the TB (1301) is transformed with the 1D transform skip in the vertical dimension or the horizontal dimension. Accordingly, in addition to the first transform coefficient t11, the remaining transform coefficients in the first column (1321) or the first row (1311) can be DC transform coefficients. The context derivation process for entropy coding a sign value of one of the DC transform coefficients in the TB (1301) can be based on other TBs, such as the TBs (1302)-(1303), and at least one previously coded sign value of at least one neighboring coefficient in the TB (1301). In an example, the at least one neighboring coefficient is in the same row or column as the one of the DC transform coefficients. In an example, one of the at least one neighboring coefficient is in a different row and a different column from the one of the DC transform coefficients.

In an example, the TB (1301) uses a transform type in the set A of transforms, and the row (1311) includes the DC transform coefficients t11-t14. A sign value of one (e.g., t13) of the DC transform coefficients t11-t14 can be based on the DC sign values of the TBs (1302)-(1303), respectively, and a previously coded sign value of a neighboring coefficient t12 in the TB (1301).

A sign value of one (e.g., t23) of the AC transform coefficients in the TB (1301) can be based on the DC sign values of the TBs (1302)-(1303), respectively, and a previously coded sign value of a neighboring coefficient (e.g., t13, t22, or the like) in the TB (1301).

The above description can be suitably adapted when one or more of the neighboring blocks use a 1D transform skip. In an embodiment, one (e.g., the TB (1303)) of the neighboring blocks uses a 1D horizontal skip and thus a first row includes DC transform coefficients l11-l12. The context derivation process for entropy coding the sign value of the transform coefficient in the block can be based on one or more DC sign values of l11-l12, the DC sign value of the TB (1302), and the at least one previously coded sign value of the at least one neighboring coefficient (if available) in the TB (1301).

In an example, a TB uses the 1D transform skip along the horizontal direction, and a flag indicating whether sign values of transform coefficients in a same row are identical can be decoded. In an example, the transform coefficients in the same row include the current transform coefficient and the previous transform coefficient where the sign value of the current transform coefficient in the TB can be coded (e.g., encoded or decoded) based on the previously coded (e.g., encoded or decoded) sign value of the previous transform coefficient, as described above.

In an embodiment, sign control information such as a flag is used to indicate if signs (e.g., all signs) of transform coefficients (e.g., t11-t14) in a row (e.g., the row (1311) of a block (e.g., the TB (1301) in FIG. 13B) are identical when a transform type used for the block is one of the set A of transforms. In an example, the sign control information is used only if a number of nonzero transform coefficients in the row is greater than a threshold value. In an example, the sign control information is used only if a block dimension (e.g., width) of the block is equal to or greater than a threshold value. In an example, each row in the block uses separate sign control information. For example, separate flags are used to indicate if signs (e.g., all signs) of transform coefficients in the respective row of the block are identical.

In an example, sign control information is used (e.g., signaled) only for a subset of rows in the block where each of the sign control information is used to indicate if signs (e.g., all signs) of transform coefficients in the respective row of the block are identical.

In an example, sign control information is used (e.g., signaled) for every N consecutive transform coefficients within one row. In another example, sign control information is used (e.g., signaled) for every N consecutive nonzero transform coefficients within one row. Exemplary values of N can include but are not limited to 4, 8, 16.

In an example, if the sign control information indicates that all the signs in the row are identical, such as the flag being true, no additional sign information is coded for the row.

In an example, if the sign control information indicates that all the signs in the row are identical, such as the flag is true, additional sign control information such as another flag is signaled to indicate the sign value for the row.

In an example, if the sign control information indicates that not all the signs in the row are identical, such as the flag being false, sign information (e.g., a respective sign value) is coded for each transform coefficient in the row.

In an example, if the sign control information indicates that not all the signs in the row are identical, such as the flag being false, and sign information for all non-zero transform coefficient except for the last non-zero transform coefficient (in the scan order) in the row is identical and signaled, sign information for the last non-zero transform coefficient is not signaled but is derived as an inverse value of the sign value of the preceding non-zero transform coefficients in the row. Referring to FIG. 13B, in an example, t21-t24 in the row (1312) are +4, +1, 0, and −2. The sign values of all non-zero transform coefficients except the last one (t24) in the row (1312) are identical (being positive) and signaled. The flag is false indicating that not all the sign values of the non-zero transform coefficients in the row (1312) are identical. Accordingly, the sign information of the last non-zero transform coefficient (t24) can be derived as being negative (e.g., the inverse value of the sign value of the preceding non-zero transform coefficients (t21 and t22) in the row).

In an embodiment, sign control information such as a flag is used to indicate if signs (e.g., all signs) of transform coefficients (e.g., t11, t21, t31, and t41) in a column (e.g., the column (1321) of a block (e.g., the TB (1301) in FIG. 13B) are identical when a transform type used for the block is one of the set B of transforms. In an example, the sign control information is used only if a number of nonzero transform coefficients in the column is greater than a threshold value. In an example, the sign control information is used only if a block dimension (e.g., height) of the block is equal to or greater than a threshold value. In an example, each column in the block uses separate sign control information. For example, separate flags are used to indicate if signs (e.g., all signs) of transform coefficients in the respective column of the block are identical.

In an example, sign control information is used (e.g., signaled) only for a subset of columns in the block where each of sign control information is used to indicate if signs (e.g., all signs) of transform coefficients in the respective column of the block are identical.

In an example, sign control information is used (e.g., signaled) for every M consecutive transform coefficients within one column. In another example, sign control information is used (e.g., signaled) for every M consecutive nonzero transform coefficients within one column. Exemplary values of M can include but are not limited to 4, 8, 16.

In an example, if the sign control information indicates that all the signs in the column are identical, such as the flag being true, no additional sign information is coded for the column.

In an example, if the sign control information indicates that all the signs in the column are identical, such as the flag being true, additional sign control information such as another flag is signaled to indicate the sign value for the column.

In an example, if the sign control information indicates that not all the signs in the column are identical, such as the flag is false, sign information (e.g., a respective sign value) is coded for each transform coefficient in the column.

In an example, if the sign control information indicates that not all the signs in the column are identical, such as the flag being false, and sign information for all non-zero transform coefficient except for the last non-zero transform coefficient (in the scan order) in the column is identical and signaled, sign information for the last non-zero transform coefficient is not signaled but is derived as an inverse value of the sign value of the preceding non-zero transform coefficients in the column. Referring to FIG. 13B, in an example, t12, t22, t32, and t42 in the column (1322) are +4, +1, 0, and −2. The sign values of all non-zero transform coefficients except the last one (t42) in the column (1322) are identical (being positive) and signaled. The flag is false indicating that not all the sign values of the non-zero transform coefficients in the column (1322) are identical. Accordingly, the sign information of the last non-zero transform coefficient (t42) can be derived as being negative (e.g., the inverse value of the sign value of the preceding non-zero transform coefficients (t12 and t22) in the column).

According to aspects of the disclosure, a context used for entropy coding sign value(s) of transform coefficient(s) can depend on a primary transform type and/or a secondary transform kernel (or type). In an example, the context used for entropy coding the sign value(s) of a current block (e.g., a TB) depends on whether a 1D IDTX or a 2D IDTX is used. For example, a transform for the current block is a 1D transform if the 1D IDTX is used, and the context or context modeling can be used for entropy coding the sign value(s) of a plurality of transform coefficients in the current block, as described above. For example, no transform is applied to the current block if the 2D IDTX is used. In some examples, a context can be used for entropy coding the sign value(s) of a plurality of transform coefficients in the current block.

In an example, the context used for entropy coding sign values of the current block depends on whether the secondary transform is applied for the current block.

Figure 14:
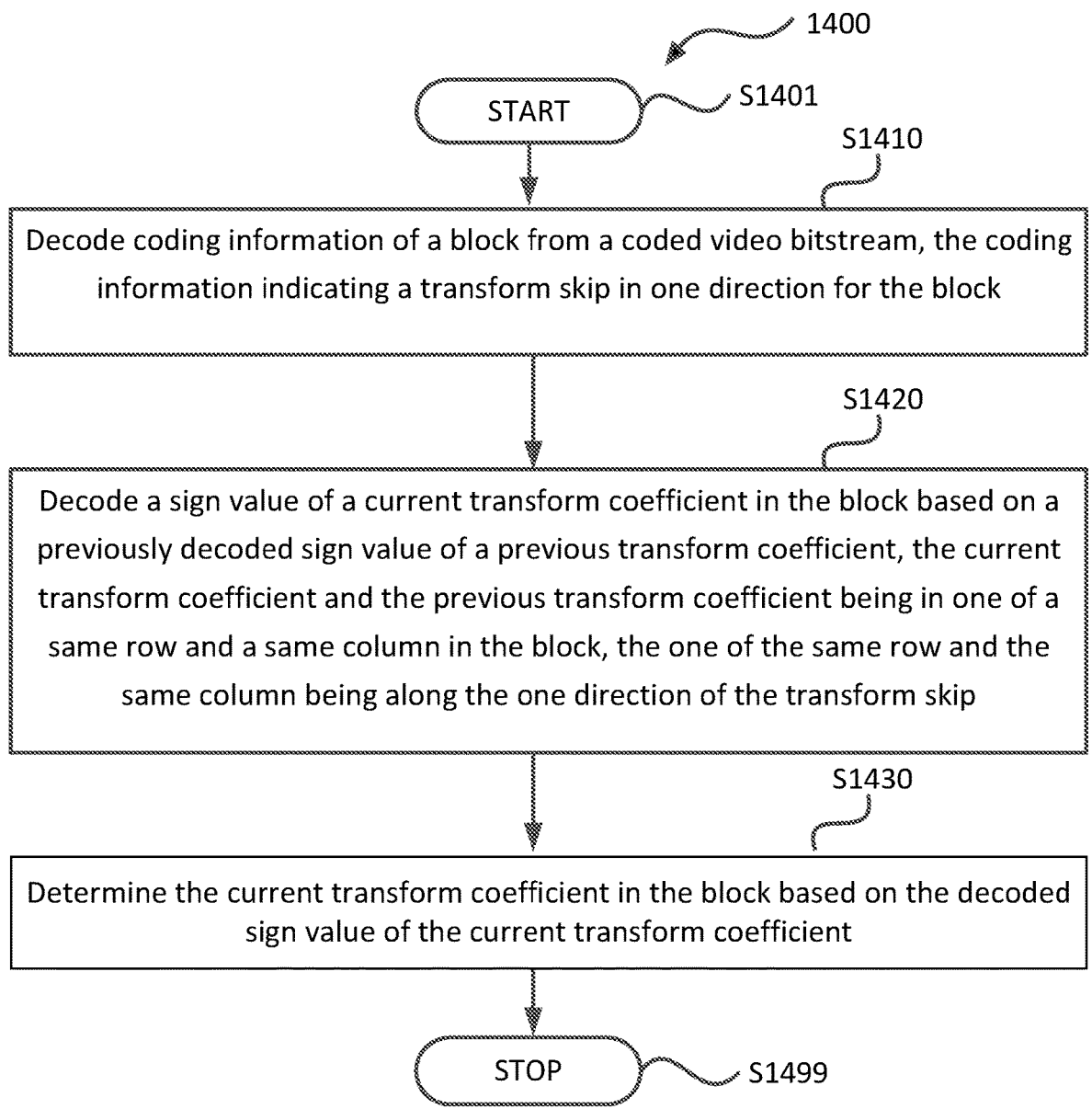
FIG. 14 shows a flow chart outlining a process (1400) according to an embodiment of the disclosure.

FIG. 14 shows a flow chart outlining a process (1400) according to an embodiment of the disclosure. The process (1400) can be used in the reconstruction of a block (e.g., a TB). In various embodiments, the process (1400) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1400) is implemented in software instructions, thus when the processing circuitry executes the software instructions, the processing circuitry performs the process (1400). The process starts at (S1401) and proceeds to (S1410).

At (S1410), coding information of the block can be decoded from a coded video bitstream. The coding information can indicate a transform skip in one direction (e.g., the horizontal direction or the vertical direction) for the block.

At (S1420), a sign value of a current transform coefficient in the block can be decoded based on a previously decoded sign value of a previous transform coefficient. The current transform coefficient and the previous transform coefficient can be in one of a same row and a same column in the block. The one of the same row and the same column can be along the one direction of the transform skip.

In an example, when the one direction is the horizontal direction, the one of the same row and the same column is the same row that is along the one direction of the transform skip. The sign value of the current transform coefficient in the block can be decoded based on the previously decoded sign value of the previous transform coefficient in the same row that is along the one direction of the transform skip. In an example, the same row is limited to one of a subset of rows in the block.

In an example, when the one direction is the vertical direction, the one of the same row and the same column is the same column that is along the one direction of the transform skip. The sign value of the current transform coefficient in the block can be decoded based on the previously decoded sign value of the previous transform coefficient in the same column that is along the one direction of the transform skip. In an example, the same column is limited to one of a subset of columns in the block.

At (S1430), the current transform coefficient in the block can be determined based on the decoded sign value of the current transform coefficient. The process (1400) proceeds to (S1499), and terminates.

The process (1400) can be suitably adapted. Step(s) in the process (1400) can be modified and/or omitted. Additional step(s) can be added. Any suitable order of implementation can be used.

In an example, a flag, or other sign control information, indicating whether sign values of transform coefficients in the same row are identical is decoded. In an example, the transform coefficients in the same row include the current transform coefficient and the previous transform coefficient.

In an example, a flag, or other sign control information, indicating whether sign values of transform coefficients in the same column are identical is decoded. In an example, the transform coefficients in the column include the current transform coefficient and the previous transform coefficient.

In an example, the sign value of the current transform coefficient in the TB is decoded based on the previously decoded sign value of the previous transform coefficient and at least one previously decoded sign value of a DC transform coefficient in another block (e.g., a neighboring block.) For example, the sign value of the current transform coefficient in the TB is decoded based on the previously decoded sign value of the previous transform coefficient, a previously decoded sign value of a DC transform coefficient in an above neighboring block of the TB, and a previously decoded sign value of a DC transform coefficient in a left neighboring block of the TB. The DC transform coefficient in the above neighboring block of the TB and the DC transform coefficient in the left neighboring block of the TB can have a DC spatial frequency.

Embodiments in the disclosure may be applied to any suitable block(s), such as luma block(s) and/or chroma block(s). Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
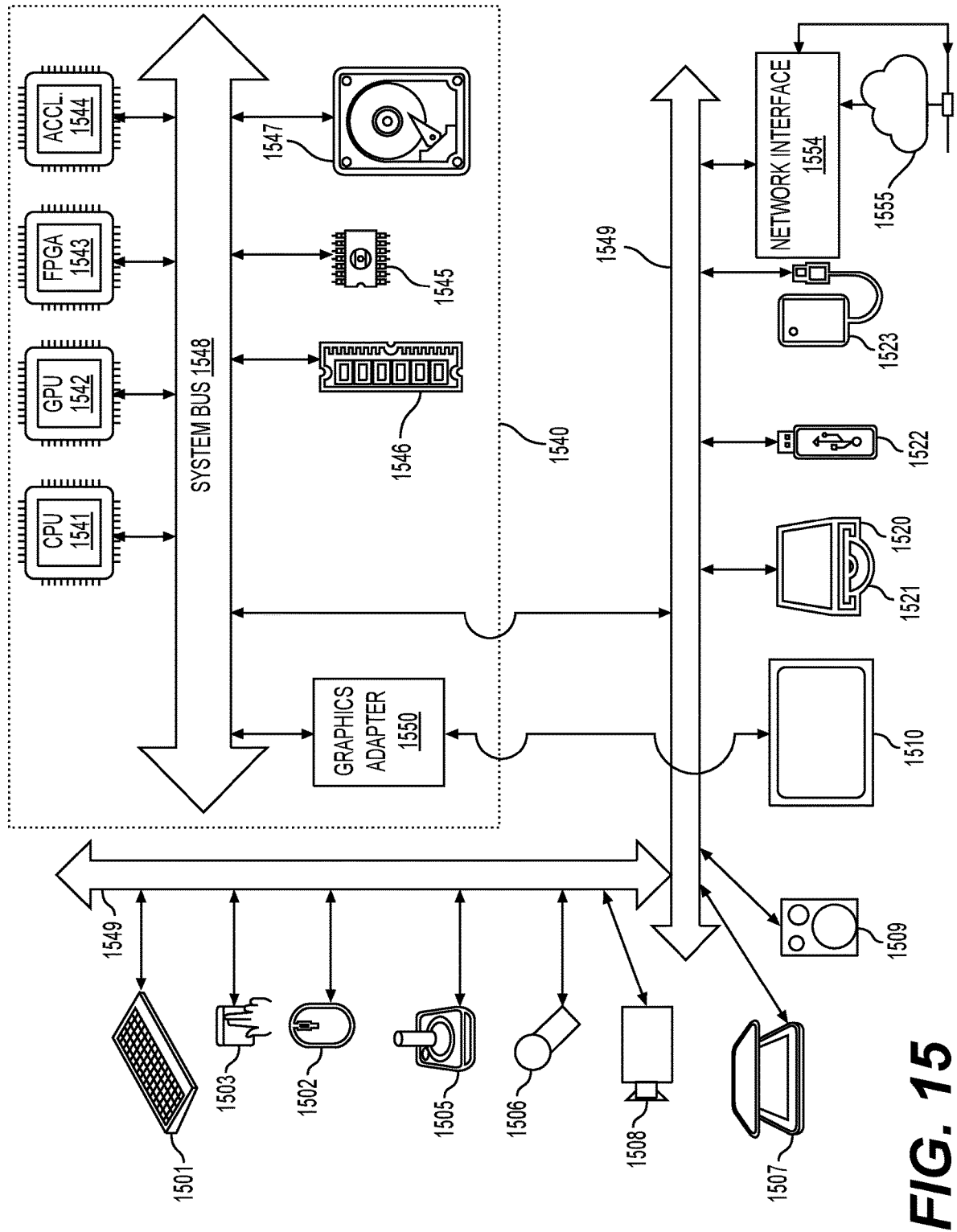
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX

A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding coding information of a transform block (TB) from a coded video bitstream, the coding information indicating a transform skip in one direction for the TB;
decoding a flag that is specific to one of a same row and a same column in the TB, the flag being set based on whether sign values of each of a plurality of transform coefficients in the one of the same row and the same column in the TB are identical and irrespective of sign values of other transform coefficients in the TB;
decoding a sign value of a current transform coefficient in the TB based on the flag and a previously decoded sign value of a previous transform coefficient, the current transform coefficient and the previous transform coefficient being in the one of the same row and the same column in the TB, the one of the same row and the same column being along the one direction of the transform skip; and
determining the current transform coefficient in the TB based on the decoded sign value of the current transform coefficient.

2. The method of claim 1, wherein
the one direction is a horizontal direction,
the one of the same row and the same column is the same row that is along the one direction of the transform skip, and
the decoding the sign value includes decoding the sign value of the current transform coefficient in the TB based on the previously decoded sign value of the previous transform coefficient in the same row that is along the one direction of the transform skip.

3. The method of claim 2, wherein the flag is limited to one of a subset of rows in the TB.

4. The method of claim 1, wherein
the one direction is a vertical direction,
the one of the same row and the same column is the same column that is along the one direction of the transform skip, and
the decoding the sign value includes decoding the sign value of the current transform coefficient in the TB based on the previously decoded sign value of the previous transform coefficient in the same column that is along the one direction of the transform skip.

5. The method of claim 4, wherein the flag is limited to one of a subset of columns in the TB.

6. The method of claim 1, wherein
the transform coefficients in the same row include the current transform coefficient and the previous transform coefficient, and
inclusion of the flag in the coding information is based on a number of nonzero transform coefficients in the same row being equal to or greater than a threshold.

7. The method of claim 1, wherein
the transform coefficients in the same column include the current transform coefficient and the previous transform coefficient, and
the flag is provided for each consecutive N coefficients in the one of the same row and the same column.

8. The method of claim 1, wherein the decoding the sign value further comprises:
decoding the sign value of the current transform coefficient in the TB based on the previously decoded sign value of the previous transform coefficient, a previously decoded sign value of a DC transform coefficient in an above neighboring block of the TB, and a previously decoded sign value of a DC transform coefficient in a left neighboring block of the TB, the DC transform coefficient in the above neighboring block of the TB and the DC transform coefficient in the left neighboring block of the TB having a DC spatial frequency.

9. The method of claim 8, wherein the decoding the sign value further comprises:
decoding the sign value of the current transform coefficient in the TB based on the previously decoded sign value of the previous transform coefficient and a weighted average of (i) the previously decoded sign value of the DC transform coefficient in the above neighboring block of the TB and (ii) the previously decoded sign value of the DC transform coefficient in the left neighboring block of the TB, the weighting being based on numbers of transform coefficients in the above neighboring block and the left neighboring block that border with transform coefficients in the TB, respectively, a location of the previous transform coefficient in the TB being a neighbor of a location of the current transform coefficient in the TB.

10. The method of claim 9, wherein the location of the previous transform coefficient in the TB is the neighbor of the location of the current transform coefficient in the TB along a scanning direction, the scanning direction being based on a scan order for coding sign values of transform coefficients in the TB.

11. The method of claim 1, wherein the decoding the sign value further comprises:
decoding the sign value of the current transform coefficient in the TB based on the previously decoded sign value of the previous transform coefficient and one or more previously decoded sign values of respective one or more transform coefficients in the one of the same row and the same column.

12. An apparatus for video decoding, comprising processing circuitry configured to:
decode coding information of a transform block (TB) from a coded video bitstream, the coding information indicating a transform skip in one direction for the TB;
decode a flag that is specific to one of a same row and a same column in the TB, the flag being set based on whether sign values of each of a plurality of transform coefficients in the one of the same row and the same column in the TB are identical and irrespective of sign values of other transform coefficients in the TB;
decode a sign value of a current transform coefficient in the TB based on the flag and a previously decoded sign value of a previous transform coefficient, the current transform coefficient and the previous transform coefficient being in the one of the same row and the same column in the TB, the one of the same row and the same column being along the one direction of the transform skip; and
determine the current transform coefficient in the TB based on the decoded sign value of the current transform coefficient.

13. The apparatus of claim 12, wherein
the one direction is a horizontal direction,
the one of the same row and the same column is the same row that is along the one direction of the transform skip, and
the processing circuitry is configured to decode the sign value of the current transform coefficient in the TB based on the previously decoded sign value of the previous transform coefficient in the same row that is along the one direction of the transform skip.

14. The apparatus of claim 13, wherein the flag is limited to one of a subset of rows in the TB.

15. The apparatus of claim 12, wherein
the one direction is a vertical direction,
the one of the same row and the same column is the same column that is along the one direction of the transform skip, and
the processing circuitry is configured to decode the sign value of the current transform coefficient in the TB based on the previously decoded sign value of the previous transform coefficient in the same column that is along the one direction of the transform skip.

16. The apparatus of claim 15, wherein the flag is limited to one of a subset of columns in the TB.

17. The apparatus of claim 12, wherein
the transform coefficients in the same row include the current transform coefficient and the previous transform coefficient, and
inclusion of the flag in the coding information is based on a number of nonzero transform coefficients in the same row being equal to or greater than a threshold.

18. The apparatus of claim 12, wherein
the transform coefficients in the same column include the current transform coefficient and the previous transform coefficient, and
the flag is provided for each consecutive N coefficients in the one of the same row and the same column.

19. The apparatus of claim 12, wherein the processing circuitry is configured to:
decode the sign value of the current transform coefficient in the TB based on the previously decoded sign value of the previous transform coefficient, a previously decoded sign value of a DC transform coefficient in an above neighboring block of the TB, and a previously decoded sign value of a DC transform coefficient in a left neighboring block of the TB, the DC transform coefficient in the above neighboring block of the TB and the DC transform coefficient in the left neighboring block of the TB having a DC spatial frequency.

20. A non-transitory computer-readable storage medium storing a program executable by at least one processor to perform:
decoding coding information of a transform block (TB) from a coded video bitstream, the coding information indicating a transform skip in one direction for the TB;
decoding a flag that is specific to one of a same row and a same column in the TB, the flag being set based on whether sign values of each of a plurality of transform coefficients in the one of the same row and the same column in the TB are identical and irrespective of sign values of other transform coefficients in the TB;
decoding a sign value of a current transform coefficient in the TB based on the flag and a previously decoded sign value of a previous transform coefficient, the current transform coefficient and the previous transform coefficient being in the one of the same row and the same column in the TB, the one of the same row and the same column being along the one direction of the transform skip; and
determining the current transform coefficient in the TB based on the decoded sign value of the current transform coefficient.

* * * * *